Oct. 28, 1947.  E. R. SWANN  2,429,851
DRIP FED ICE CUBE MAKING AND STORING ARRANGEMENT
Filed March 17, 1944  3 Sheets-Sheet 1

Inventor
Edward R. Swann
by Harry S. Duars
Attorney.

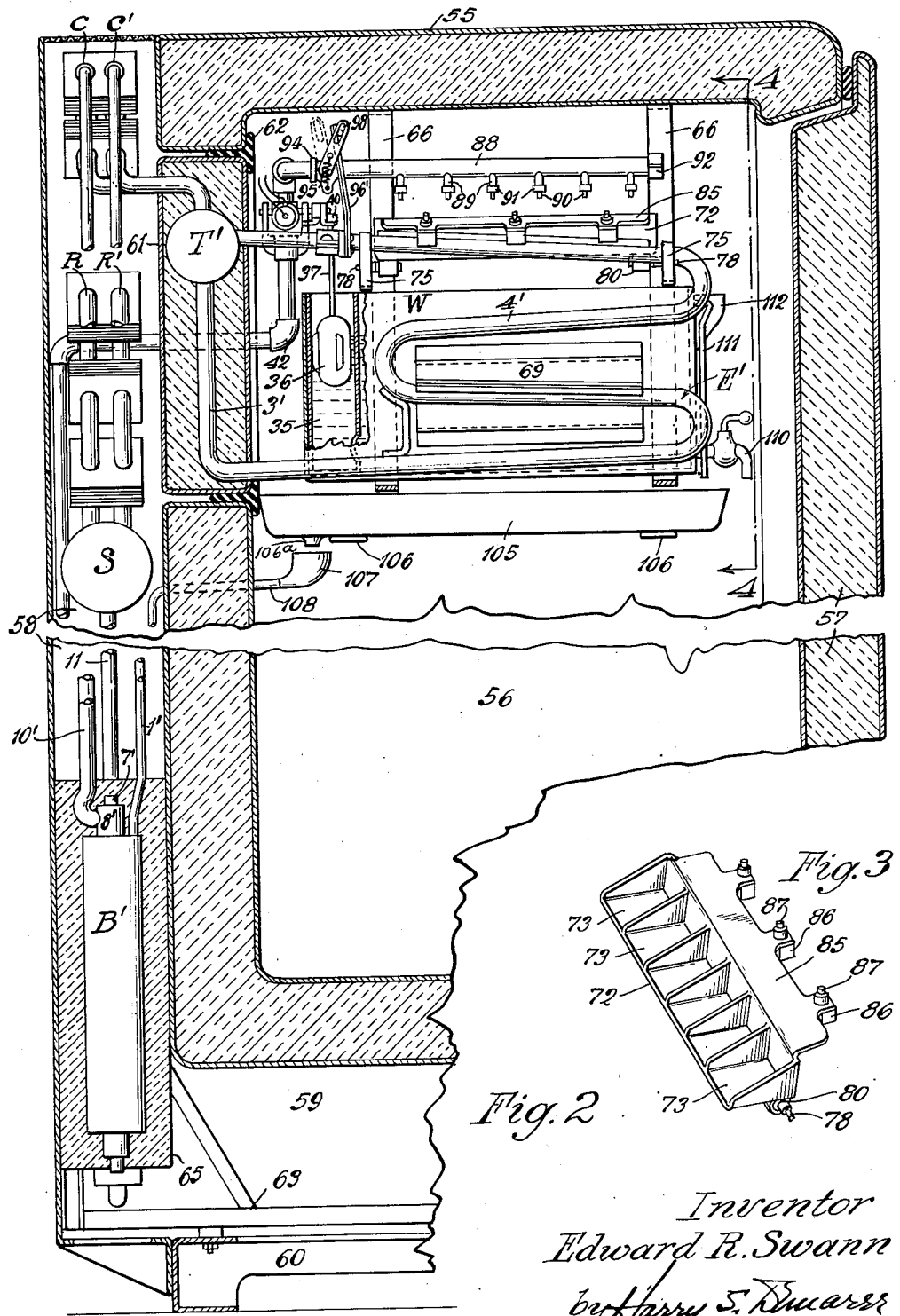

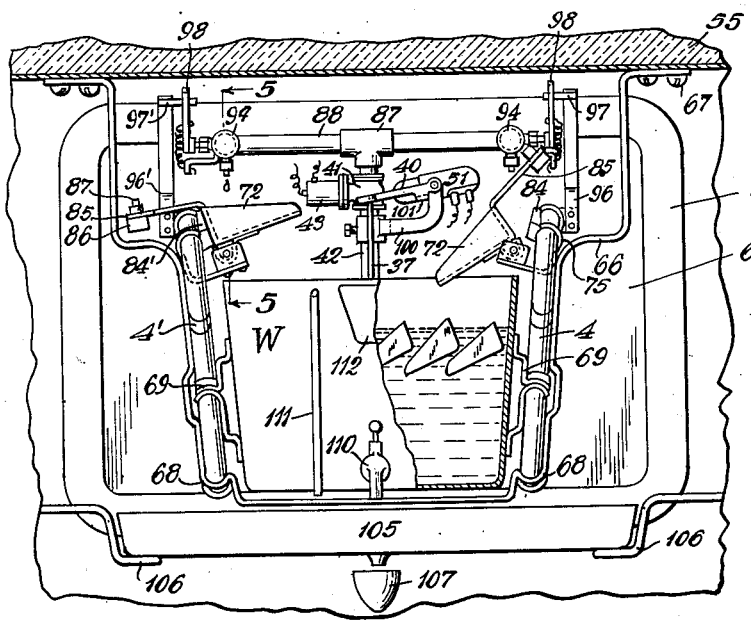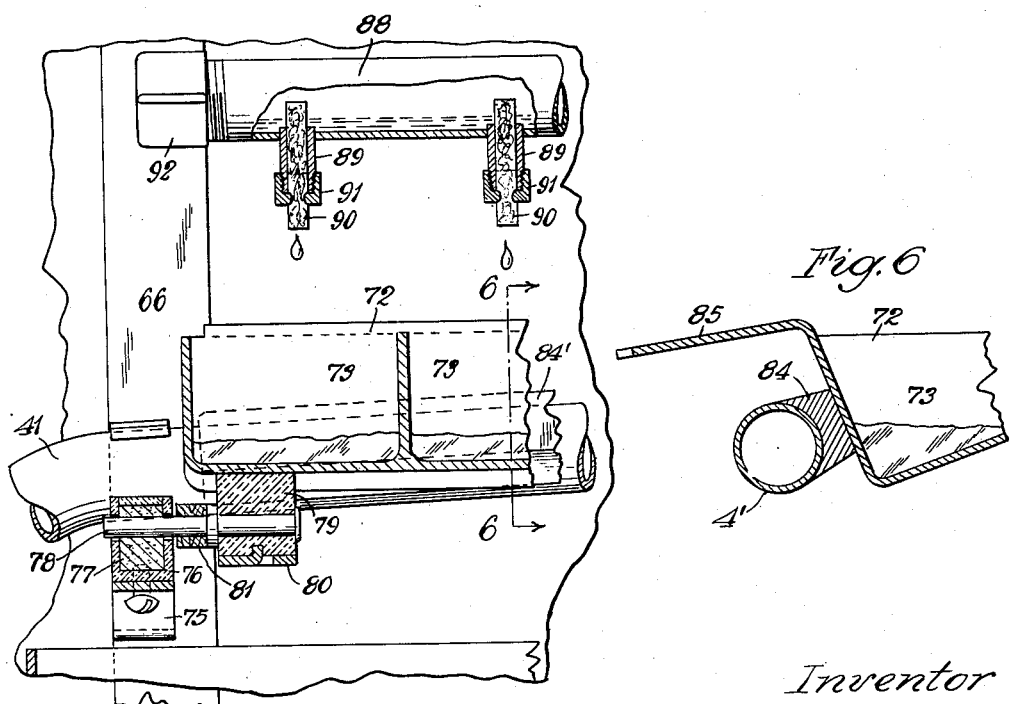

Patented Oct. 28, 1947

2,429,851

UNITED STATES PATENT OFFICE 2,429,851

DRIP FED ICE CUBE MAKING AND STORING ARRANGEMENT

Edward R. Swann, Floral Park, N. Y., assignor to The Hoover Company, North Canton, Ohio, a corporation of Ohio Application March 17, 1944, Serial No. 526,943

19 Claims. (Cl. 62—5)

This invention relates to the art of refrigeration and more particularly to a refrigerating apparatus particularly adapted for continuous production of individual bodies of ice and continuous harvesting of the previously frozen ice in a manner permitting ready utilization of any desired number of individual blocks of ice.

In accordance with the invention there is provided a refrigerating apparatus consisting of two intermittent systems controlled to operate alternately so as to give the effect of an uninterrupted production of a useful refrigerating effect.

It is a further object of the invention to provide a refrigerating apparatus of the above described character in which the alternately operable cooling units of the system alternately refrigerate blocks of ice during evaporating or operative periods and defrost and free previously frozen blocks of ice during their regenerating or non-refrigerating periods.

It is a further object of the present invention to provide a refrigerating apparatus which produces readily available individual ice cubes and maintains substantially frost-free high humidity and odorless refrigerating conditions within the refrigerated space.

It is a further object of the present invention to provide a refrigerating apparatus so constructed and arranged that water to be frozen is continuously supplied directly from an ultimate source of supply to the refrigerator and is frozen into individual bodies of ice by a process of accretion.

Other and further objects of the invention will become apparent as the description proceeds when taken in connection with the accompanying drawing in which:

Figure 2 is a partial sectional elevational view of the refrigerating apparatus of the present invention associated with a domestic refrigerating cabinet.

Figure 3 is a perspective detailed view of an ice mould structure.

Figure 4 is a view taken along the line 4—4 of Figure 2 looking in the direction of the arrow.

Figure 5 is a sectional view taken along the line 5—5 of Figure 4 looking in the direction of the arrow, and Figure 6 is a sectional view taken along the line 6—6 of Figure 5 looking in the direction of the arrow.

Figure 1:
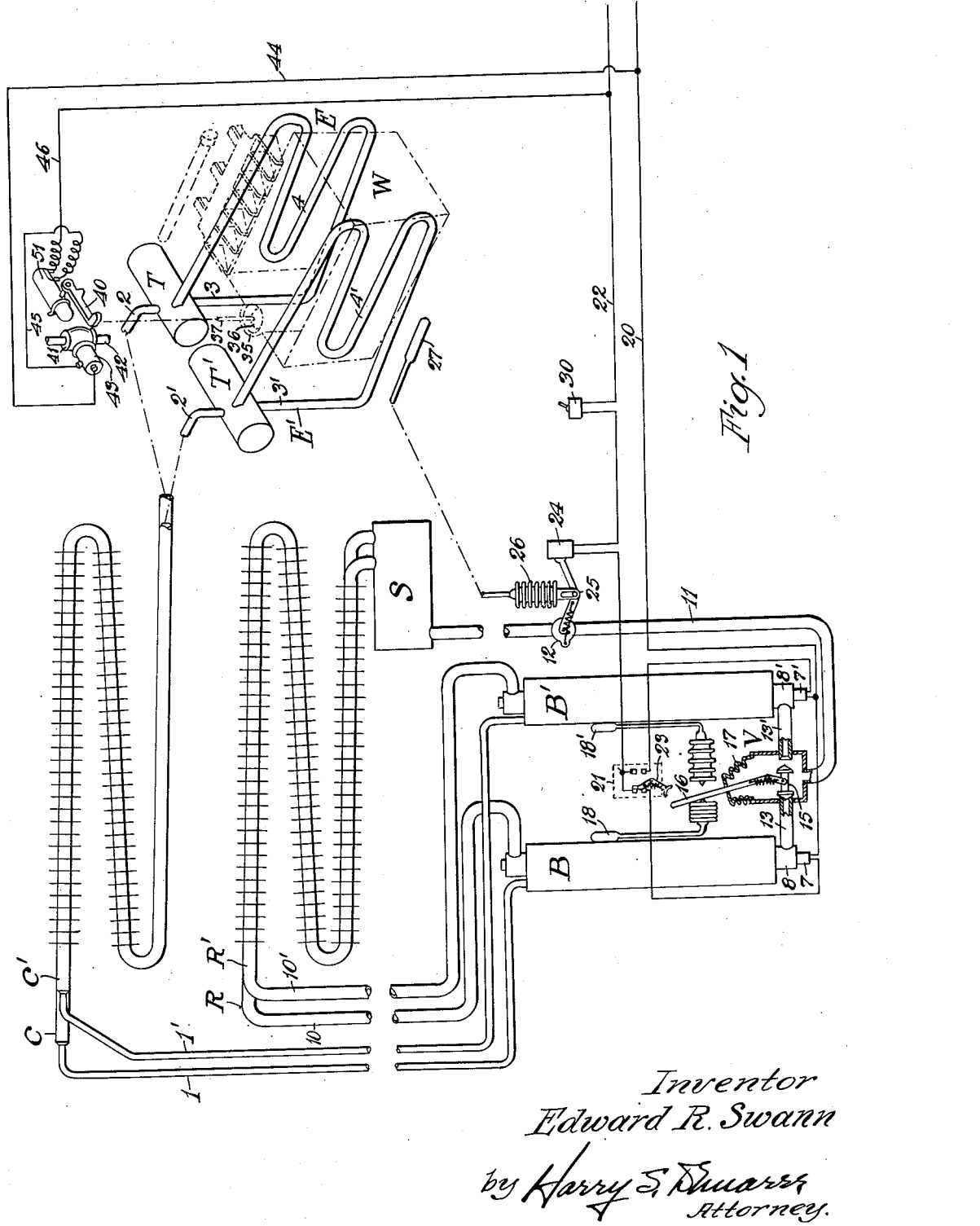
Figure 1 is a schematic diagram of an apparatus embodying the present invention.

Referring now to Figure 1 in detail there are disclosed a pair of intermittent absorption refrigerating apparatuses. The elements of each pair of associated refrigerating apparatuses are identical and corresponding elements of the refrigerating apparatuses are distinguished by primed reference characters.

The right hand, Figure 1, absorber-generator B, charged with a suitable absorbent such as strontium chloride, is connected by a conduit 1 to a tubular air-cooled condenser C which discharges through a conduit 2 into a collecting tank T with which is associated a sinuous evaporator conduit E comprising a vertically extending down pipe 3 and a series of serially connected ascending cooling conduits 4.

The absorber-generator B is provided with a central heating space which may be heated by a suitable combustible fuel burner or, as illustrated, by an electrical heater 7. An annular chamber 8 surrounds the heating space 7 and forms part of a cooling system. The upper portion of the chamber 8 communicates at its upper portion by means of conduit 10 with the upper portion of a tubular air cooled condensing or heat rejecting element R which discharges at its lower end into a collecting tank S. The collecting tank S communicates with a switching valve V through a conduit 11 which includes a control shut-off valve 12.

The valve chamber V communicates with the cooling jackets 8 and 8' by means of conduits 13, 13', respectively.

A snap acting valve element 15 is mounted in valve chamber V and is arranged to allow communication between the chamber V and one of the conduits 13, 13' at a time. The valve is operated by an actuating lever 16 extending through a flexible bellows 17 forming the upper wall of the chamber V. Each generator-absorber has associated therewith a thermostatic mechanism 18, 18' positioned to engage the lever 16 and to actuate the valve element 15 in a manner to be described.

The electrical heaters 7 and 7' are each connected to a suitable source of electrical energy by line conductor 20. The heaters 7 and 7' are also connected to the opposite sides of a double pole double throw switch 21 which is connected to the line conductor 22. The actuating arm 16 of the valve mechanism is positioned to engage a snap acting switch mechanism 23 so as to operate the switch and the valve V simultaneously and thus effect simultaneous control of the heating and cooling of the absorber-generator.

A suitable control switch 24 is interposed in the line wire 22. The switch 24 and valve 12 are interconnected by a snap-acting mechanism 25 which is operated by a thermostatic bellows 26 responsive to a temperature condition produced in the vicinity of the control bulb 27.

A suitable manual cut-off switch 30 is interposed in the line wire 22 ahead of the automatic switch 24.

In the position shown the switch mechanism 21 has energized the heating unit 7 for the absorber-generator B. As the absorber-generator B is heated, refrigerant, such as ammonia, is driven out of the absorbent therein contained, flows through the conduit 1 and is condensed to the liquid phase in the condenser C from which it flows through pipe 2 into the evaporator collecting tank T and evaporator E until the absorbent is sufficiently relieved of its absorbed refrigerant at which time the temperature of the absorber-generator B begins to rise causing expansion of the thermostatic mechanism 18 to operate the actuator 16 to the control.

During the period in which the absorber-generator B is being heated a cooling fluid flows from tank S through the cooling jacket 8' of the absorber-generator B'. This cools the absorbent in the absorber-generator B' causing the same to absorb refrigerant vapor which reduces the pressure therein sufficiently to cause low temperature evaporation of refrigerant in the evaporator E'. The heat of absorption produced in the absorber-generator B' vaporizes the coolant supplied to the cooling jacket A' which vapor then flows through conduit 10' and is liquefied in the heat rejecting element R' from which it returns to the collecting vessel S.

As the absorber-generator B' is cooled its thermostatic mechanism 18' will collapse and as the absorber-generator B reaches its end point on the generation cycle its temperature rises sufficiently to cause the thermostatic element 18 to actuate the control through the element 16 so as to de-energize heater 7, energize heater 7', interrupt the flow of coolant to the absorber-generator B' and to allow such coolant to flow to the absorber-generator B. Upon actuation of valve V a large body of coolant dumps into the cooling jacket of the previously heated absorber-generator which effects very rapid cooling of the aforesaid absorber-generator and quickly lowers the temperature sufficiently to initiate absorption of refrigerant vapor and consequent evaporation in the associated evaporator. After completion of this process the above described cycles of operation of the absorber-generators B and B' and their associated refrigerating parts will be reversed.

The thermostatic mechanism 26 and 27 responds to demand for refrigeration and operates through linkage 25 to control the supply of electrical energy to the heating element by means of the switch 24 and the supply of cooling fluid to the switching valve V by means of the valve mechanism 12. It has no influence on the internal control of the apparatus.

The manual switch 30 is provided to allow shut-off of the apparatus when desired. A shut-off valve linked to switch 30 for simultaneous operation may be provided, if desired, to allow the operator to discontinue heating and cooling of the absorber-generators B and B'.

A water tank W is associated with the evaporators E and E'. A float well 35 is formed in the rear of tank W to receive a float 36 and its associated operating rod 37. The rod 37 engages the end of an actuating arm 40 of a mercury switch 51. A water supply mechanism, to be more fully described hereinafter, is provided for the tank W and includes a normally open valve 41 in water pipe 42. A solenoid mechanism 43 is arranged when energized to close the valve 41. The solenoid mechanism 43 is energized by electrical conductor 44 connected to the line wire 20 and electrical conductor 45 which connects to the switch 51. The switch 51 is connected to the line wire 22 by an electrical conductor 46.

Referring now to Figure 2 the apparatus is illustrated in the manner in which it is mounted in an insulated domestic refrigerator cabinet 55. The cabinet is provided with the usual refrigerated interior space 56 to which access is obtained by an insulated closure 57. The cabinet structure is provided with a vertically extending cooling air flue and mechanism space 58 which is also open to a lower space 59 positioned between the bottom insulated wall of the chamber 56 and the base structure 60 of the cabinet. The rear wall of the chamber 56 is provided with an opening of a size to admit the cooling mechanism and its associated parts. An insulated closure panel 61 is positioned in the cabinet wall opening and is sealed with suitable gaskets 62. An angle and channel iron frame indicated generally at 63 is provided to support the refrigerating mechanism, the associated water tank and panel 61 in position on the cabinet.

The absorber-generators are positioned in the bottom portion of the flue 58 and are suitably encased in insulation 65. The chamber S, heat rejecting elements R and R' and condensers C and C' are positioned in vertically spaced relationship in the chamber 58. The collecting tanks T and T' and the down conduits 3 and 3' of the evaporators E and E', respectively, extend through and are partially encased in the insulated panel 61 which completes the rear wall of the chamber 56. The evaporator conduits 4 and 4', the tank W, water conduit 42 and the electrical switch 51 are all positioned within the chamber 56.

The evaporator structure is supported within the chamber 56 by a pair of U-shaped brackets 66 which are secured as indicated at 67 to the upper wall of the cabinet structure 55 and extend under the water tank W and evaporator coils 4 and 4'. The bracket 66 includes curved portions 68 engaging under and around the lowest substantially horizontal run of the evaporator conduits 4 and 4' to support and position the evaporators.

The water tank W is provided with elongated sheet metal saddle elements 69 which slidably support the water tank W on the next to the lowest substantially horizontal run of evaporators 4 and 4' and also cool the contents of tank W by conduction to a temperature slightly above the freezing point of water.

Ice forming moulds 72 provided with individual ice block forming pockets 73 are mounted above the upper lateral side edges of the water tank W. Suitable brackets 75 are attached to the upper run of the sinuous evaporator conduits 4 and 4' a distance apart slightly greater than the length of the ice moulds 72. The ends of the brackets 75 are secured to hollow casings 76 which enclose cold resisting lubricant impregnated blocks 77 in which there is pivoted the supporting and pivot pins 78 for the ice moulds. The inwardly extending portions of the pins 78 are secured to blocks of insulating material 79 rigidly secured to brackets 80 carried by the ice moulds 72. Hard wood spacers indicated at 81 may be provided between the bearing block casing 76 and the insulating material 79.

The above described bearing structures pivotally support the ice mould 72 in position to rest against elongated conducting pads 84 and 84' associated with the uppermost runs of evaporator coils 4 and 4', respectively. The elements 84 and 84' may be welded, brazed or otherwise secured to their associated evaporator conduits in a manner to provide thermal contact therebetween and to refrigerate the rear upstanding walls of the ice pockets 73 when the ice moulds 72 and 84' are tilted to rest against the elements 84 and 84' as is illustrated in Figure 6.

The ice moulds are provided with rearwardly projecting flanges 85 extending outwardly across the evaporator conduits 4 and 4'. The flanges 85 include a plurality of downwardly projecting counterweight elements 86 and upwardly projecting bumpers 87 which may be made of rubber or suitable material.

The balance of the ice moulds 72 is such that when empty the flanges 85 and their associated weights 86 will cause the moulds to lie against the pads 84 or 84', in the manner illustrated in Figure 6, to be refrigerated.

The water supply pipe 42 above valve 41 is provided with a T-connection 87 to a U-shaped pipe 88, the arms of which overlie the ice moulds 72 as is illustrated in Figure 4. Those portions of conduit 88 which overlie the ice moulds 72 are provided with a plurality of nipples 89 each of which is positioned directly above one of the individual ice pockets 73 in the moulds 72. Elongated wick elements 90 extend through the nipples 89 and are secured in position by screwthreaded cap elements 91 having reduced openings which tightly grasp the wicks 90 to hold them in place. The ends of the U-shaped pipe 88 are suitably closed as by caps 92.

Each arm of the pipe 88 is provided with a shutoff valve 94 provided with a snap acting lever actuating mechanism 95. The rear portion of the upper flight of evaporator conduits 4 and 4' each support bi-metallic thermostatic elements 96 and 96', respectively, which carry actuating pins 97 and 97' engaging in elongated slots 98 in their associated actuating mechanism 95.

The organization of the control mechanism for the water supply is illustrated in detail in Figures 2 and 4. As there depicted, the mercury switch 51 and its actuating arm 40 are pivotally supported in a bifurcated bracket 100 carried by the water pipe 42. The actuating arm 40 is provided with a stop lug 101 which limits the movement of the magnetic switch in the off direction when contact between arm 40 and rod 37 is broken as by lowering the water level in the float well 35.

A suitable drip collecting tray 105 is supported on shelf extensions 106 beneath the evaporator and ice making structures in position to collect and entrap any moisture draining from either tank W, evaporator conduits 4 and 4' or the ice making mould structure 72. The tray 105 is provided with a drainage orifice 106a adjacent its rear portion which discharges into a funnel 107 communicating with a pipe 108 which leads to a collecting vessel or to a point of ultimate disposal of the collected water.

The tank W is provided with a faucet 110 to provide a source of cold drinking water. A small pipe 111 communicates with the interior of the tank W adjacent the upper portion thereof and discharges into the tray 105 to limit the water level within the tank W. A filling spout 112 is provided on the front face of tank W to facilitate filling thereof.

In the operation of the invention a demand for refrigeration will actuate the switch 24 and valve 12 to energize the heating circuit for the absorber-generators and to allow flow of coolant through conduit 11 into switching valve V. In the position of the control mechanism illustrated in Figure 1 coolant is being supplied to the absorber-generator B' and electrical energy to the heater 7 of absorber-generator B. In this state of affairs refrigerant is evaporating in the evaporator E' and the resulting vapor is flowing into the absorber-generator B' through conduit 2', condenser C' and conduit 1'. The ice moulds 72 associated with evaporator conduits 4' will be in the position illustrated in Figure 4 and will be frozen to the pad 84' due to the low temperature at which such pad is maintained by the evaporator coil. The low temperature of the evaporator 4' will have actuated thermostat 96' to cause the same to operate its associated valve 94 to the open position, thus allowing water to be supplied to the wicks 89 in that leg of pipe 88 positioned above the ice mould 72 associated with evaporator coil 4'. As the water drips slowly through the wicks into the pockets 73 of ice mould 72, ice is formed therein and builds up by a process of accretion.

During this time cooling fluid will be circulating through the jacket j' of absorber-generator B' to remove the heat of absorption produced by absorption of the refrigerant vapor evolved in the evaporator E'.

Also during the period of application of heat to the absorber-generator B refrigerant vapor will be evolved and will be condensed in condenser C. The condensed refrigerant will fill the evaporator E and partially fill its associated tank T. The evaporator E will thus be warm and the thermostat 96 will actuate the valve 94 in the arm of pipe 88 positioned above the ice mould 72 associated with evaporator E to the closed position, thus preventing the supply of water to the wicks in that side of pipe 88.

The above described process will continue until such time as the control 18, 18' actuates the main controlling mechanism at which time the supply of heat to absorber-generator B will be discontinued, the absorber-generator B' will then be heated and the cooling medium will be supplied to the jacket 8 of absorber-generator B. When this sequence of events is completed, refrigeration will be produced in evaporator E' which will cool the associated thermostat 96 to allow water to be supplied to the associated wick carrying leg of the conduit 88. Due to the discontinuance of refrigeration in evaporator E' the same will quickly warm up due to heat imparted thereto from air within the compartment 56. This process will defrost the coil 4' and will melt the freezing bond between the ice mould 72 and pad 84'. The continual drippage of water into the ice blocks formed in the pockets 73 will tend to loosen them, which process will also be accelerated by warming up of evaporator E'. When the freezing bond between the pad 84' and ice mould 72 is broken the weight of the ice in the pockets 73 will overbalance the ice mould 72 causing the same to tilt in a clockwise direction, as viewed in Figure 4, until the bumpers 87 contact pipe 88 in which position the ice blocks will dump into the water contained within tank W after which the flange 85 and weight 86 will tilt the ice mould 73 back to its original position against the pad 84'.

The above described sequence of events will continue with first one side of the evaporator structure and then the other producing refrigeration and freezing ice blocks and subsequently melting the ice blocks into the water within the tank W, thus producing a large supply of ice cubes which may be harvested at will in any number by ladling them from the tank W. The ice discharged into the tank W together with the refrigeration imparted thereto through the saddle structure 69 will maintain the contents of the tank at a temperature slightly above the freezing point of water, thus providing a large supply of cold drinking water and also assuring preservation of the ice formed therein.

Should the water level in the tank rise, for example, about half the distance between the water level illustrated in Figures 2 and 4 and the top edge of the tank W, the float 36 will rise and through its associated shaft 37 and the actuating arm 40 will tilt the mercury switch 51 to the closed circuit position. This action energizes the solenoid 43 which closes the valve 41 and thus shuts off the water supply and terminates the production of ice. Ice production can be resumed by ladling out sufficient ice to lower the water level or by drawing off water through the faucet 110.

It is inherent in the operation of this invention that the evaporator, the ice freezing elements, and the tank W are alternately refrigerated and relieved of any frost which may collect thereon. The frost is intermittently melted and discharged into tray 105 from which it is conducted to some convenient point of disposal by a conduit 108. Thus, the apparatus is never hampered by a heavy frost coat and favorable food storage conditions are maintained within the chamber 56.

The large body of water in the tank W acts as a thermal fly wheel and insures steady, uniform refrigerating conditions for preserving foodstuffs.

When it is desired to remove the tank W, for cleaning for example, the switch 30 will be actuated to the off position. This will de-energize whichever absorber-generator is then being heated and the system will cease to produce refrigeration as soon as the then absorbing absorber-generator has completed its absorption phase of operation. When this has been achieved the previously refrigerating evaporator coil will warm up and defrost after which the tank W will be free for removal. Prior to removal of tank W sufficient water should be withdrawn to lower the float 36 sufficiently to disengage the arm 40 and rod 37. During this period there will be no supply of water to the apparatus as both evaporators will be warm and the associated thermostats will have actuated the snap acting valves in the arms of pipe 88 to the closed position. The tank may be removed simply by sliding the same forwardly on the saddle 69. The tank may be replaced by sliding it into the position illustrated in Figure 4 and the water level raised to the desired value by pouring water in through the filling opening 112. When the switch 30 is then closed the apparatus will resume operation and will operate in the manner hereinabove described.

The particular ice producing structure disclosed herein is not restricted to use with the particular refrigerating mechanism herein disclosed. It is readily applicable to other types of refrigerating apparatuses provided with one or more cooling units which operate to produce a refrigerating effect intermittently and to defrost in the periods between periods of active production of refrigeration.

While the invention has been illustrated and described in detail it is not to be limited thereto but various changes may be made in the construction, design and arrangement of parts without departing from the spirit of the invention or the scope of the appended claims.

I claim:

1. Refrigerating apparatus including a pair of cooling units operable alternately to refrigerate and defrost, an ice mould associated with each cooling unit and pivotally mounted adjacent thereto, said ice moulds being so balanced with respect to their pivots that they will rest against said cooling units when empty and be overbalanced to a dumping position when charged with ice.

2. Refrigerating apparatus including a cooling unit operable alternately to refrigerate and defrost, an ice mould mounted adjacent said cooling unit to move into contact with said cooling unit when empty and to move away therefrom when charged with ice, a water supply conduit arranged to discharge water into said mould when it is in contact with said cooling unit, and thermostatic valve means responsive to the temperature of said cooling unit for governing the flow of water into said conduit.

3. In a refrigerating apparatus a pair of laterally spaced cooling units arranged to be operated alternately to produce refrigeration, an ice mould structure pivotally mounted adjacent each of said cooling units and weighted to pivot against said cooling units when empty and to pivot away therefrom into a dumping position when charged with ice, a water receptacle positioned between and supported from said cooling units in position to receive ice discharged from said ice moulds, water supply means having a conduit branch above each of said ice moulds to discharge water thereinto when said moulds are in contact with said cooling units, valve means controlling the flow of water into said conduit branches, thermostatic means associated with each of said cooling units responsive to the temperature thereof arranged to close its associated valve when the temperature of the cooling unit to which the thermostatic means responds rises above a predetermined minimum value, and capillary means for feeding water in drops from said conduit branches into said ice moulds.

4. In a refrigerating apparatus a pair of laterally spaced cooling units arranged to be operated alternately to produce refrigeration, an ice mould structure pivotally mounted adjacent each of said cooling units and weighted to pivot against said cooling units when empty and to pivot away therefrom into a dumping position when charged with ice, a water receptacle positioned between and supported from said cooling units in position to receive ice discharged from said ice moulds, water supply means having a conduit branch above each of said ice moulds to discharge water thereinto when said moulds are in contact with said cooling units, valve means controlling the flow of water into said conduit branches, thermostatic means associated with each of said cooling units responsive to the temperature thereof arranged to close its associated valve when the temperature of the cooling unit to which the thermostatic means responds rises above a predetermined minimum value, capillary means for feeding water in drops from said conduit branches into said ice moulds, a normally open master control valve governing the supply of water to said water supply means, and means responsive to a predetermined water level in said tank for actuating said master control valve to closed position.

5. In a refrigerating apparatus a pair of cooling units operable alternately on refrigerating and defrosting cycles with respect to each other, ice freezing and dumping means associated with each of said cooling units for freezing water when the cooling units are refrigerating and operable to discharge ice when the cooling units are defrosting, ice storage means arranged to be refrigerated by said cooling units and to receive ice discharged by said ice freezing and dumping means, and automatic water supply means arranged to supply water to be frozen to each of said ice freezing and dumping means when their associated cooling units are refrigerating.

6. In a refrigerating apparatus a pair of cooling units operable alternately on refrigerating and defrosting cycles with respect to each other, ice freezing and dumping means associated with each of said cooling units for freezing water when the cooling units are refrigerating and operable to discharge ice when the cooling units are defrosting, ice storage means arranged to be refrigerated by said cooling units and to receive ice discharged by said ice freezing and dumping means, and automatic water supply means arranged to supply water to be frozen in the form of separated drops to each of said ice freezing and dumping means when the associated cooling units are refrigerating whereby ice bodies are built up in said ice freezing and dumping means by accretion of frozen drops of water.

7. Refrigerating apparatus including a pair of absorption refrigerating systems each including a generator-absorber, a condenser and an evaporator, means for heating said generator-absorber, means for cooling said generator absorber, control means governing the operation of said heating and cooling means to supply heat to one generator-absorber while the other is cooled alternately; ice making apparatus associated with said evaporators comprising ice freezing elements mounted to be refrigerated by each evaporator, a water receptacle carried on and refrigerated by said evaporators arranged to receive ice discharged by said ice freezing elements, and means for supplying water to said ice freezing elements when their associated evaporators are producing refrigeration.

8. Refrigerating apparatus including a pair of absorption refrigerating systems each including a generator-absorber, a condenser and an evaporator, means for heating said generator-absorber, means for cooling said generator-absorber, control means governing the operation of said heating and cooling means to supply heat to one generator-absorber while the other is cooled alternately; ice making apparatus associated with said evaporators comprising ice freezing elements mounted to be refrigerated by each evaporator, a water receptacle carried on and refrigerated by said evaporators arranged to receive ice discharged by said ice freezing elements, means for supplying water to said ice freezing elements when their associated evaporators are producing refrigerant, and means responsive to a predetermined condition in said water receptacle for discontinuing the flow of water to said ice freezing elements.

9. Refrigerating apparatus comprising a chilling structure, a water receptacle refrigerated by said chilling structure, an ice making apparatus arranged to be refrigerated by said chilling structure and to discharge ice into said water receptacle, water supply means arranged to supply water to be frozen to said ice making apparatus, and means responsive to an increase in the water level in said receptacle beyond a predetermined value for discontinuing the supply of water to said ice making apparatus.

10. Refrigerating apparatus comprising a chilling structure, a water receptacle refrigerated by said chilling structure, an ice making apparatus arranged to be refrigerated by said chilling structure and to discharge ice into said water receptacle, and water supply means including a plurality of wicks arranged to drip water to be frozen into said ice-making apparatus.

11. Refrigerating apparatus comprising a chilling structure, a water receptacle refrigerated by said chilling structure, an ice making apparatus arranged to be refrigerated by said chilling structure and to discharge ice into said water receptacle, water supply means arranged to supply water to be frozen to said ice making apparatus, means responsive to an increase in the water level in said receptacle beyond a predetermined value for discontinuing the supply of water to said ice making apparatus, a drip tray underlying said receptacle and said cooling unit to receive water discharged therefrom, and means for conveying water from said drip tray to a place of disposal.

12. Refrigerating apparatus comprising a chilling structure, a water receptacle refrigerated by said chilling structure, an ice making apparatus arranged to be refrigerated by said chilling structure and to discharge ice into said water receptacle, water supply means arranged to supply water to be frozen to said ice making apparatus, a float in said water receptacle, a valve controlling the supply of water to said water supply means, and switch means operated by said float to cause said valve to close when the water level in said receptacle exceeds a predetermined value.

13. Refrigerating apparatus comprising a pair of vertically positioned sinuous conduits, a water container positioned between and removably supported by said conduits, an elongated horizontal heat conducting pad on each conduit above said container, a tilt bucket ice freezing element divided into a plurality of pockets, means pivotally supporting said tilt buckets from said conduits adjacent said heat conducting pads and above said container, counter-balance means arranged to tilt said buckets against said pads when said pockets are empty, said tilt buckets being so constructed and arranged that they tilt away from said pads into position to discharge the contents of said pockets into said container when said pockets are charged with ice, and means for supplying water to be frozen to said pockets.

14. In a refrigeration apparatus a pair of laterally spaced cooling units arranged to be operated alternately to produce refrigeration, an ice mold structure movably mounted adjacent each of said cooling units and arranged to move into contact with said cooling units when empty and to move away therefrom when charged with ice, a receptacle positioned to receive ice discharged from said molds, and means for supplying water to said ice molds when they are being refrigerated by said cooling units.

15. Refrigerating apparatus including a pair of cooling units operable alternately to refrigerate and defrost, an ice mold associated with each cooling unit and pivotally mounted adjacent thereto, said ice molds being so balanced with respect to their pivots that they will rest against said cooling units when empty and be overbalanced to a dumping position when charged with ice, water supply means arranged to drip water into said molds, and thermostatic means controlling the flow of water to said water supply means and arranged to discontinue the supply of water thereto when said cooling units warm above a predetermined temperature.

16. Ice making apparatus comprising a cooling unit operable to refrigerate and defrost alternately, an ice mold supporting mechanism, an ice mold mounted on said mechanism for movement from an ice supporting position in contact with said cooling unit to an ice discharging position out of contact with said cooling unit and biasing said supporting mechanism to support said ice mold in ice discharging position, and means biasing said ice mold to said ice supporting position with sufficient force to overcome the bias of said ice mold when empty and with insufficient force to overcome the bias of said ice mold when charged with ice.

17. Ice making apparatus comprising a cooling unit operable to refrigerate and defrost alternately, an ice mold supporting mechanism, an ice mold mounted on said mechanism for movement from an ice supporting position in contact with said cooling unit to an ice discharging position out of contact with said cooling unit and biasing said supporting mechanism to support said ice mold in ice discharging position, means biasing said ice mold to said ice supporting position with sufficient force to overcome the bias of said ice mold when empty and with insufficient force to overcome the bias of said ice mold when charged with ice, and water supply means arranged to drip water to be frozen into said mold when said cooling unit is producing refrigeration.

18. Ice making apparatus comprising a cooling unit operable to refrigerate and defrost alternately, an ice mold supporting mechanism, an ice mold mounted on said mechanism for movement from an ice supporting position in contact with said cooling unit to an ice discharging position out of contact with said cooling unit and biasing said supporting mechanism to support said ice mold in ice discharging position, means biasing said ice mold to said ice supporting position with sufficient force to overcome the bias of said ice mold when empty and with insufficient force to overcome the bias of said ice mold when charged with ice, an ice receptacle, means positioning said receptacle to receive ice discharged from said mold, and water supply means arranged to drip water to be frozen into said mold when said cooling unit is producing refrigeration.

19. Ice making apparatus comprising a cooling unit operable to refrigerate and defrost alternately, an ice mold supporting mechanism, an ice mold mounted on said mechanism for movement from an ice supporting position in contact with said cooling unit to an ice discharging position out of contact with said cooling unit and biasing said supporting mechanism to support said ice mold in ice discharging position, means biasing said ice mold to said ice supporting position with sufficient force to overcome the bias of said ice mold when empty and with insufficient force to overcome the bias of said ice mold when charged with ice, water supply means arranged to drip water into said ice mold, valve means controlling the flow of water to said water supply means, and temperature responsive means arranged to operate said valve means in response to the temperature of said cooling unit.

EDWARD R. SWANN.

REFERENCES CITED

The following references are of record in the file of this patent:

UNITED STATES PATENTS

| Number | Name | Date |
|---|---|---|
| 1,510,147 | Keith | Sept. 30, 1924 |
| 1,788,393 | Hull | Jan. 13, 1931 |
| 2,145,775 | Muffly | Jan. 31, 1939 |
| 2,161,321 | Smith | June 6, 1939 |
| 2,319,523 | Trigg | May 18, 1943 |
| 2,359,780 | Muffly | Oct. 10, 1944 |
| 2,364,559 | Storer | Dec. 5, 1944 |